Nov. 8, 1966  K. E. McCONNAUGHAY  3,284,056
EMULSIFIER
Filed Feb. 14, 1964   2 Sheets-Sheet 1
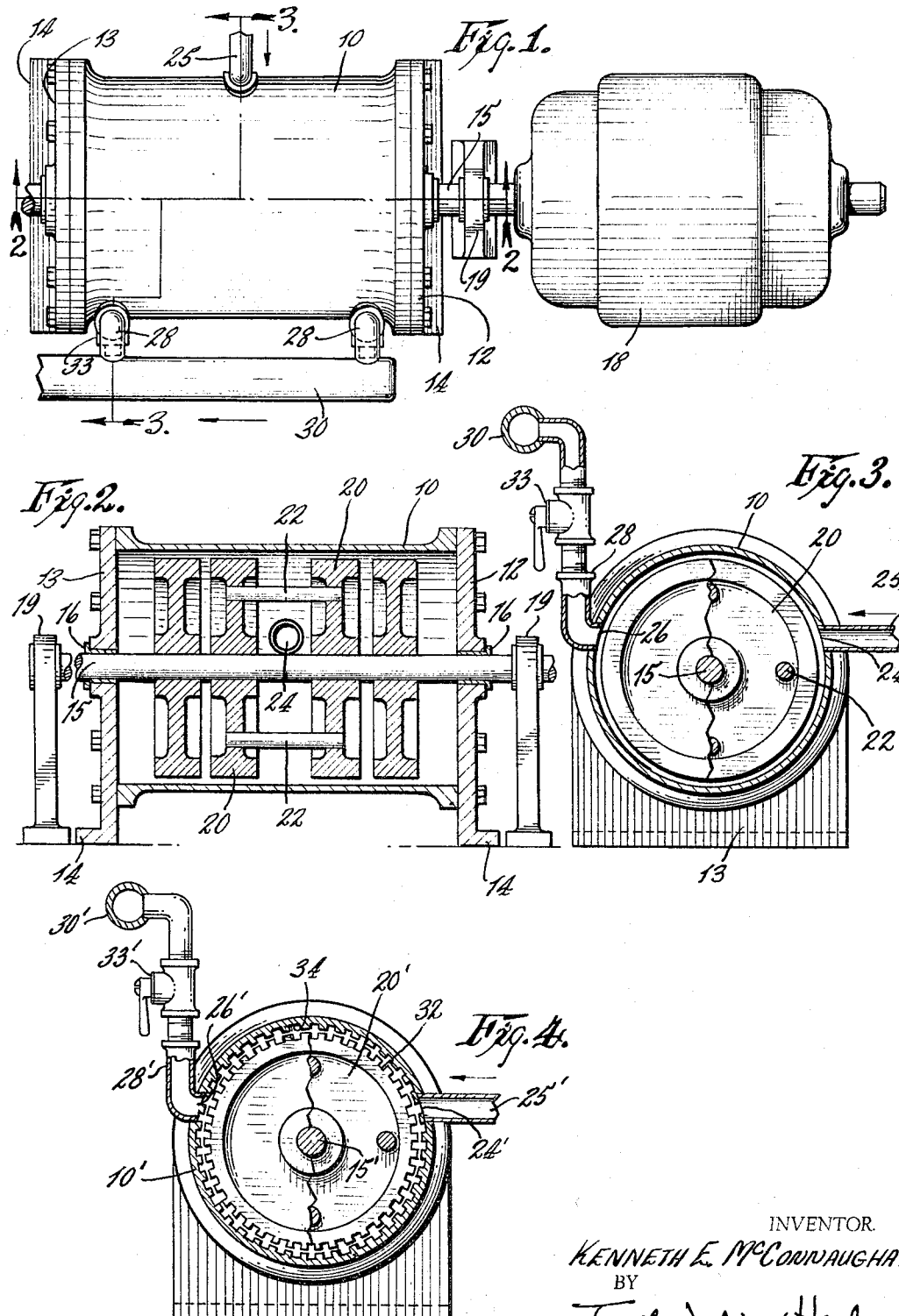
INVENTOR.
KENNETH E. McCONNAUGHAY,
BY
Trask, Jenkins & Hanley
ATTORNEYS.

United States Patent Office 3,284,056
Patented Nov. 8, 1966

3,284,056
EMULSIFIER
Kenneth E. McConnaughay, P.O. Box 871, Lafayette, Ind.
Filed Feb. 14, 1964, Ser. No. 344,862
7 Claims. (Cl. 259—10)

This invention relates to an emulsifier, and more particularly to an emulsifying apparatus for use in the preparation of bituminous emulsions of the type in which a bitumen, such as asphalt, is dispersed in water.

In the construction of emulsifiers of this general type there is provided a cylindrical housing carrying a rotatable shaft having a plurality of axially spaced rotors mounted thereon. It has heretofore been the practice to provide an inlet in one end of the housing for introducing the materials to be emulsified into the housing and an outlet at the opposite housing end for withdrawing the emulsified materials from the housing. This causes the materials entering the inlet to exert a pressure on the packing gland around the rotatable shaft with the resultant leaking and replacement of the packing gland. It also produces a substantial load on the shaft bearings.

It is therefore the general object of my invention to provide an emulsifier which will overcome the problems and difficulties discussed above. More specifically, it is an object of my invention to provide an emulsifier which can be simply and easily constructed, which will insure an intimate mixing and emulsification of the materials passing therethrough, which will have a high flow rate, and which will prove sturdy and durable in use.

According to one form of the invention, there is provided a housing having a cylindrical inner wall and having a coaxial rotatable shaft extending therethrough. A plurality of axially spaced rotors are mounted on said shaft for rotation therewith with their outer faces disposed adjacent the inner wall of the housing. An inlet for the materials to be emulsified is provided in the housing between a pair of said rotors. The materials to be emulsified flow in opposite directions in the housing, are subjected to the emulsifying action of the adjacent housing and rotor faces, and are discharged through a pair of outlets at the opposite ends of the housing.

Other objects and features of my invention will become apparent from the more detailed description which follows and from the accompanying drawing in which:

FIG. 1 is a plan view of an emulsifier embodying my invention;

FIG. 2 is a vertical section taken on the line 2—2 of FIG. 1;

FIG. 3 is a vertical section taken on the line 3—3 of FIG. 1;

FIG. 4 is a vertical section similar to FIG. 3, but showing a modified form of the invention.

Figure 5:
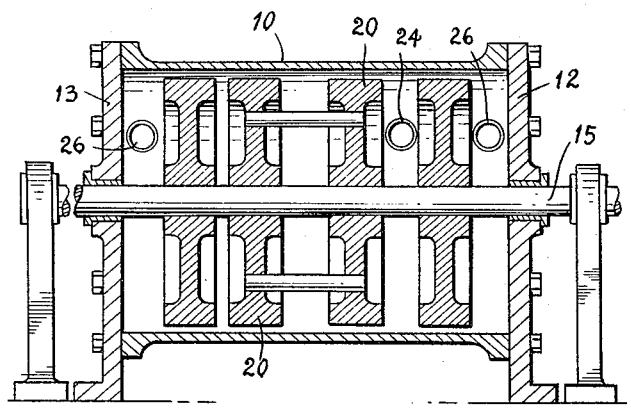
FIG. 5 is a vertical section similar to FIG. 3, but showing another modified form of the invention.

As illustrated in the drawing, the emulsifier comprises a housing 10 having a cylindrical inner wall and closed at its ends by heads 12 and 13 conveniently provided with ground-engaging feet 14. A rotatable shaft 15 is coaxially carried within the housing in packing glands 16 in the heads 12 and 13. The shaft extends through the housing 10 and projects axially therebeyond for connection a drive rotor 18. The shaft is supported outside the extent of the housing on bearings 19.

As shown in FIGS. 2 and 3, a plurality of axially spaced rotors 20 are rigidly mounted on the shaft 15 for rotation therewith. Conveniently, the most inwardly located pair of rotors 20 are interconnected by a plurality of axially extending circumferentially spaced mixing rods 22. The outer circumferential faces of the rotors 20 are spaced immediately adjacent the inner cylindrical wall of the housing 10, so that upon rotation of the shaft 15, the outer faces of said rotors will cooperate with said inner wall face f the housing to produce shear forces for effecting emulsification of the materials passing through the emulsifier.

The emulsifier inlet 24 connected to an inlet pipe 25 is provided in the housing 10 intermediate its length and between an adjacent pair of rotors 20. The outlet for the emulsifier comprises a pair of axially spaced outlet openings 26 formed in the housing 10 adjacent the heads 12 and 13. The outlets 26 are located axially along the length of the housing between the heads 12 and 13 and the adjacent outermost pair of rotors 20. Each of the outlet openings 26 is connected to a pipe 28, and the pipes 28 may be connected to a discharge manifold 30 as shown in FIG. 1. In this manner, the materials to be emulsified in the emulsifier pass through the inlet opening 24 and move generally in opposite axial directions (to left and right in FIG. 2) toward the outlet openings 26. During their movement toward the outlets 26, the materials will be emulsified by the shear forces produced by the outer faces of the rotors 20 moving over the closely adjacent inner housing wall.

In the embodiment of the invention illustrated in FIGS. 2 and 3, the rotors 20 and the inner housing wall are smooth walled, and the materials being emulsified move from the inlet 24 to the outlets 26 in the space between the outer rotor faces and inner housing wall. In the embodiment shown in FIG. 4, the outer faces of the rotors 20' mounted on the rotatable shaft 15' are provided with axially extending grooves 32 and the inner wall of the housing 10' is also provided with axially extending grooves 34. In this modification the materials entering through the centrally located inlet 24' move in opposite axial directions toward the pair of axially spaced outlets 26' through the spaces provided by the grooves 32 and 34. In certain applications it may be desirable to employ only the grooves in either the rotors or the inner housing wall. If only the grooves 34 in the inner housing wall are employed, said grooves will have an axial extent corresponding to the axial length of the rotors 20' along the length of the shaft 15'.

With the inlets 24 and 24' intermediate the outlets 26 and 26' the materials entering the emulsifier will move in two general directions toward the outlets as contrasted to the general unidirectional flow in conventional emulsifiers wherein there is a single inlet and a single outlet at the opposite ends of the housing. This two directional flow means that only one-half as much of the materials will have to pass between any given rotor and the housing. Consequently, the spacing between the rotors 20 and the housing and the depth of the grooves 32 and 34 may be smaller than in conventional emulsifiers having unidirectional flow, while still providing a high through rate or capacity. Further, this smaller spacing and groove depth provides improved shear between the rotors and housing to effect better emulsification.

It is desirable that an emulsifier be capable of producing different size particles which may be generally classified as large particles, small particles, and a combination of small and large particles. To this end, the inlets 24 and 24' are centered along the length of the housing, and fluid control valves 33 are mounted in the discharge pipes 28 adjacent the outlets 26 or 26'. As will be understood, by partially closing the right hand valve 33 and permitting the left hand valve 33 to remain open, the flow of material through the outlet to the right in FIG. 1 will be restricted relative to the flow of fluid through the discharge pipe 28 to the left in FIG. 1. Consequently, the material flowing to the right will have a longer dwell time in the housing than the fluid flowing to the left and will thus be subjected to greater emulsification so that it will have a smaller particle size than the material exiting the discharge pipe to the left of FIG. 1. In this manner, with the valve partially closed, the emulsifier will produce a combination of both large and small size particles. It it is desired to produce only large particles, both valves 33 will be in their fully open positions. If it is desired to produce only small size particles, both the valves 33 will be partially closed so that the dwell time will be increased in both halves of the emulsifier.

As an alternative to the valves 33, said valves may be omitted and the inlet 24 or 24' may be axially displaced along the length of the housing toward one of the outlets in the pair of outlets 26 or 26', as shown in FIG. 5, wherein the inlet is disposed between a pair of rotors 20 adjacent one end of the housing and the outlets 26 are disposed adjacent the housing end walls 12 and 13. In this manner, the materials to be emulsified that move toward the closer of the outlets will be subjected to the emulsifying action of a fewer number of rotors and will thereby be subjected to a lesser overall shear action so that they will have a larger particle size than the portion of the materials to be emulsified that must pass a larger number of rotors toward the outlet which is displaced farther from the inlet. Irrespective of the axial positioning of the inlet along the housing, said inlet must be disposed out of alignment with one of the rotors so that entering materials will flow into the space between a pair of adjacent rotors.

I claim:
1. An emulsifier comprising
   (a) a housing having a cylindrical inner wall,
   (b) a rotatable shaft coaxial with said housing,
   (c) a plurality of axially spaced rotors mounted on said shaft for rotation therewith with their outer faces disposed adjacent the inner wall of said housing,
   (d) at least one rod extending axially between a plurality of said rotors for rotation therewith,
   (e) an inlet opening in said housing in alignment with the space between the most centrally located pair of rotors, and
   (f) a pair of outlet openings in said housing between the outermost rotors and the ends of said housing in direct communication with the space between said outermost rotors and said ends of the housing.
2. An emulsifier comprising
   (a) a housing having a cylindrical inner wall,
   (b) a rotatable shaft coaxial with said housing,
   (c) a plurality of axially spaced rotors mounted on said shaft for rotation therewith with their outer faces disposed adjacent the inner face of said housing,
   (d) a pair of outlet openings in said housing located axially beyond the pair of rotors at the opposite ends of said plurality of rotors, and
   (e) an inlet opening in said housing between a pair of adjacent rotors and spaced unequal axial distances from said pair of outlets whereby there is a different number of rotors between the inlet and each of the outlets.
3. An emulsifier comprising
   (a) a housing having a cylindrical inner wall and opposed end walls,
   (b) a rotatable shaft coaxial with said housing,
   (c) at least one pair of axially spaced rotors mounted on said shaft for rotation therewith with their outer faces disposed adjacent the inner wall of said housing, the spacing between said rotors and housing constituting the only fluid flow path through said housing,
   (d) an inlet opening in said housing located axially intermediate said pair of rotors, and
   (e) a pair of outlet openings in said housing located axially beyond and on opposite sides of said pairs of rotors in direct communication with the space between said rotors and end walls.
4. An emulsifier as set forth in claim 3 in which
   (a) the outer faces of said rotors have a plurality of circumferentially spaced axially extending grooves formed thereon.
5. An emulsifier as set forth in claim 3 in which
   (a) the inner face of said housing has a plurality of circumferentially spaced axially extending grooves formed therein, said grooves having axial extents at least equal to the axial extent of said rotors.
6. An emulsifier as set forth in claim 3 in which
   (a) the outer face of said rotors and the inner face of said housing have pluralities of circumferentially spaced axially extending grooves formed therein.
7. An emulsifier comprising
   (a) a housing having a cylindrical inner wall,
   (b) a rotatable shaft coaxial with said housing,
   (c) a plurality of axially spaced rotors mounted on said shaft for rotation therewith with their outer faces disposed adjacent the inner wall of said housing,
   (d) an inlet opening in said housing in alignment with the space between the most centrally located pair of rotors,
   (e) a pair of outlet openings in said housing between the outermost rotors and the ends of said housing, and
   (f) at least one of said outlet openings having a valve thereat for controlling the relative flow through said outlet openings.

References Cited by the Examiner
UNITED STATES PATENTS 2,153,537   4/1939   Heath et al. _____ 259—9 X
2,774,577   12/1956  Anderson et al. _____ 259—9

WALTER A. SCHEEL, *Primary Examiner.*

J. M. BELL, *Assistant Examiner.*